(12) United States Patent
Westhoff et al.

(10) Patent No.: US 7,918,464 B2
(45) Date of Patent: *Apr. 5, 2011

(54) GASKET PACKAGE

(75) Inventors: James A. Westhoff, Langhorne, PA (US); James A. Kelly, Upper Black Eddy, PA (US); Christopher Handago, Plymouth Meeting, PA (US)

(73) Assignee: A-Lok Products, Inc., Tullytown, PA (US)

( * ) Notice: Subject to any disclaimer, the term of this patent is extended or adjusted under 35 U.S.C. 154(b) by 1037 days.

This patent is subject to a terminal disclaimer.

(21) Appl. No.: 11/699,515

(22) Filed: Jan. 29, 2007

(65) Prior Publication Data

US 2007/0252343 A1 Nov. 1, 2007

Related U.S. Application Data

(63) Continuation-in-part of application No. 11/415,136, filed on May 1, 2006, now Pat. No. 7,624,992.

(51) Int. Cl.
*F16L 17/00* (2006.01)
*B65D 85/00* (2006.01)

(52) U.S. Cl. ........................................ 277/616; 206/320

(58) Field of Classification Search .......... 277/607–609, 277/616; 206/320, 497, 586
See application file for complete search history.

(56) References Cited

U.S. PATENT DOCUMENTS

| 3,129,812 | A | 4/1964 | Deasy |
| 3,559,844 | A | 2/1971 | Schlosberg |
| 3,675,933 | A | 7/1972 | Nappe |
| 3,958,313 | A | 5/1976 | Rossborough |
| 4,203,190 | A | 5/1980 | Temple et al. |
| 4,478,437 | A | 10/1984 | Skinner |
| 4,903,970 | A | 2/1990 | Ditcher et al. |
| 5,029,907 | A | 7/1991 | Gundy |
| 5,431,459 | A | 7/1995 | Gundy |
| 5,529,312 | A | 6/1996 | Skinner et al. |
| 5,876,039 | A | 3/1999 | Skinner et al. |
| 6,152,455 | A | 11/2000 | Brockway et al. |
| 6,406,025 | B1 * | 6/2002 | Westhoff et al. ............... 277/314 |
| 6,568,691 | B1 | 5/2003 | Westhoff et al. |
| 6,921,085 | B2 | 7/2005 | Mirales et al. |
| 7,624,992 | B2 * | 12/2009 | Westhoff et al. ............... 277/616 |
| 2003/0230860 | A1 * | 12/2003 | Mirales et al. ................. 277/630 |
| 2007/0252342 | A1 * | 11/2007 | Westhoff et al. ............... 277/609 |

* cited by examiner

*Primary Examiner* — Shane Bomar
*Assistant Examiner* — Gilbert Y Lee
(74) *Attorney, Agent, or Firm* — Fay Sharpe LLP

(57) ABSTRACT

A gasket assembly includes a one-piece gasket that has a mounting end, for mounting to an associated enclosure body, and a pipe engaging end, for receiving an associated pipe. An intermediate section is located between the mounting end and the pipe engaging end. A mounting element is of one piece with one of the mounting end, the pipe engaging end and the intermediate section. A clamping member is used with the gasket. The clamping member is looped to assume an annular configuration. A retaining member extends through an aperture located in the mounting element and through the clamping member for retaining the clamping member to the gasket in a transport position of the gasket assembly.

17 Claims, 11 Drawing Sheets

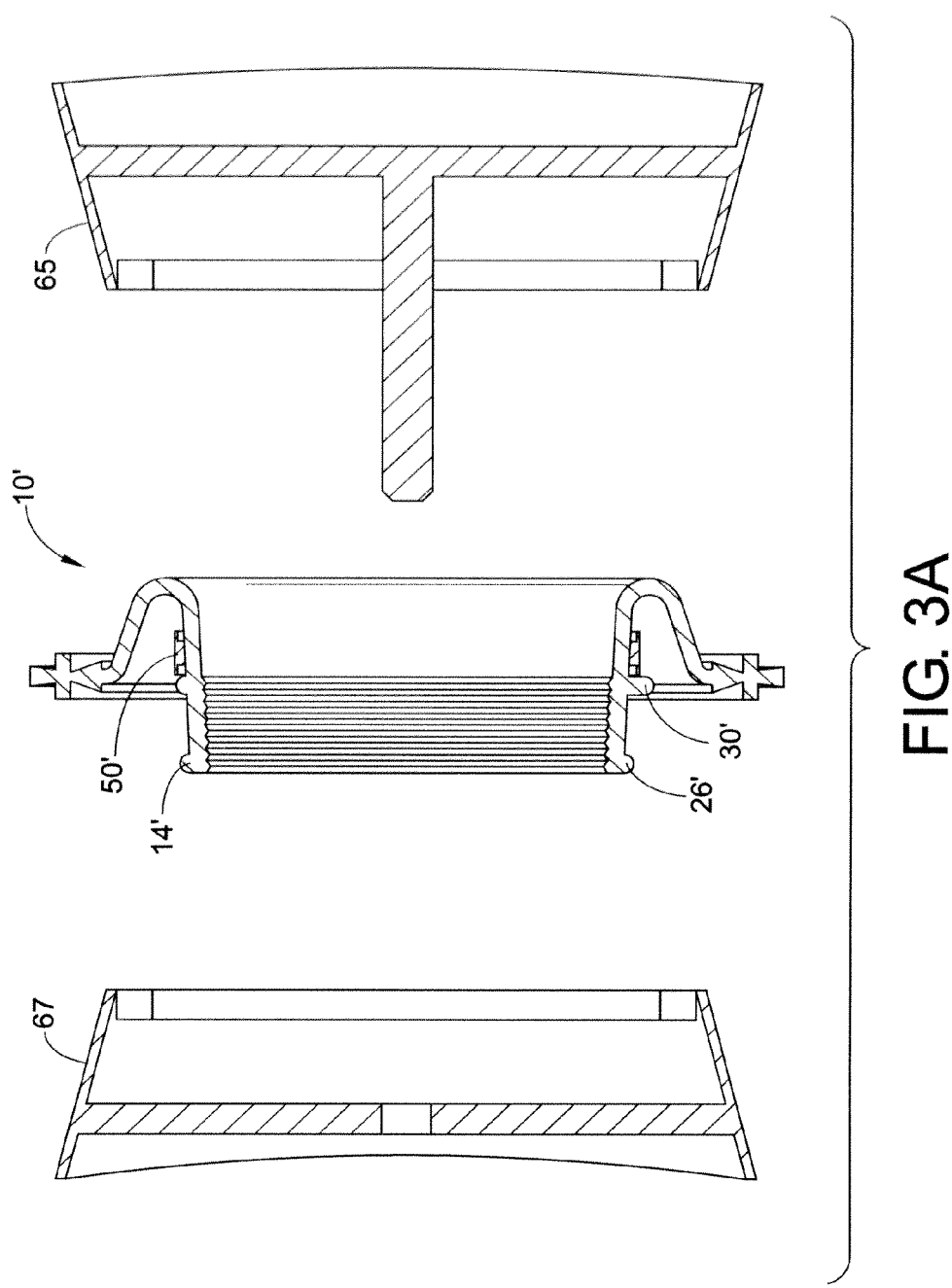

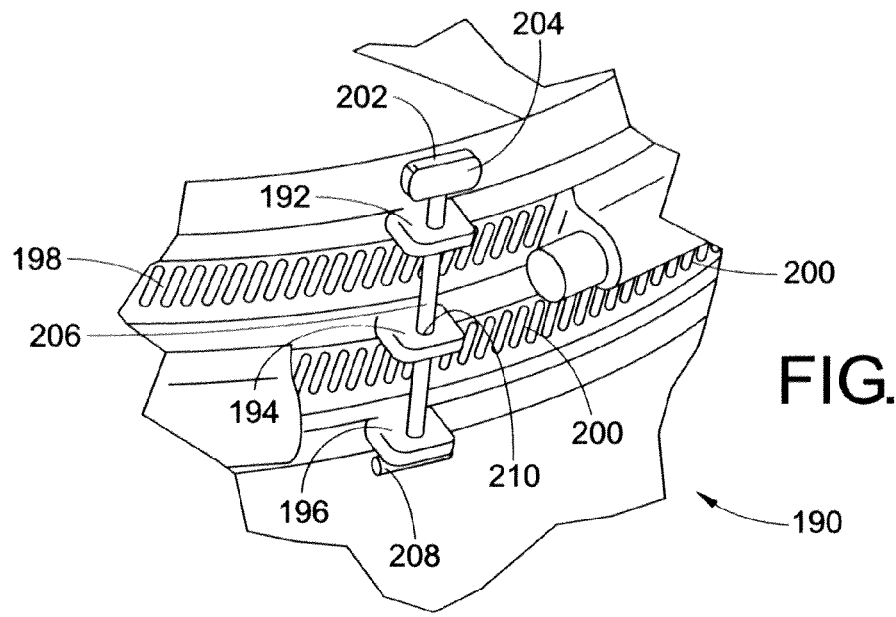
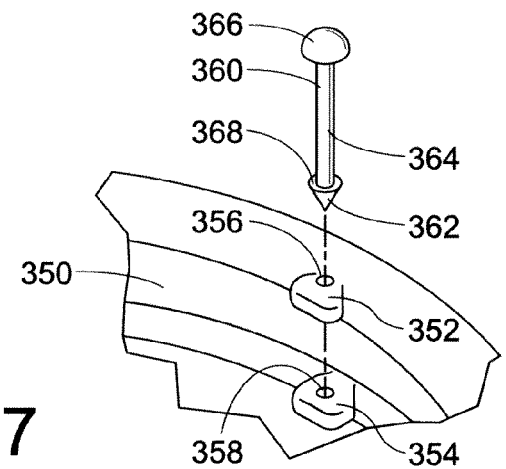

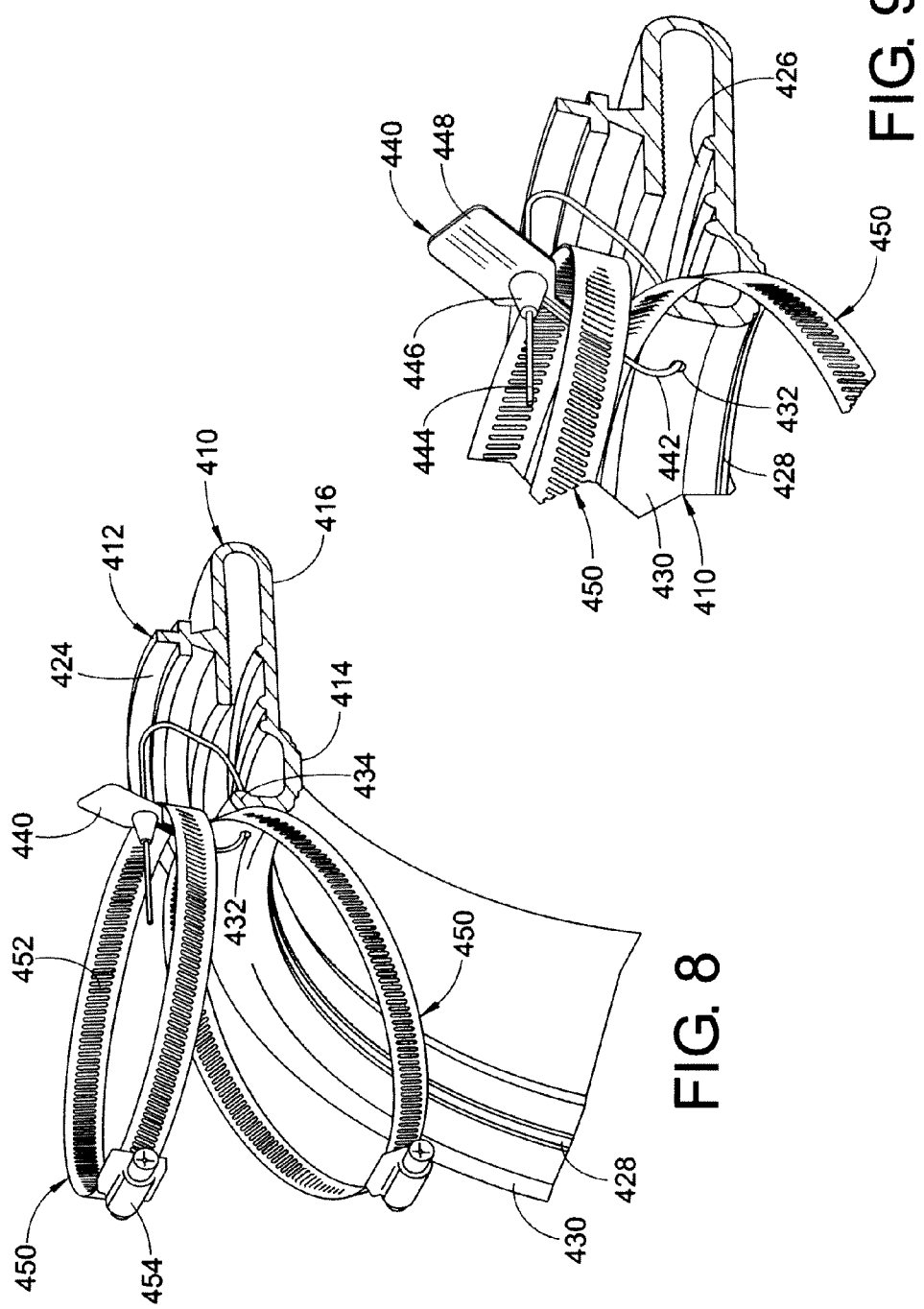

GASKET PACKAGE

This application is a continuation-in-part of application Ser. No. 11/415,136 filed on May 1, 2006 now U.S. Pat. No. 7,624,992. The disclosure of that application is incorporated herein by reference, in its entirety.

BACKGROUND

The present invention relates to gaskets for use in providing a liquid tight seal between an opening in a wall and a pipe. More particularly, the invention relates to a packaging arrangement for retaining a clamp assembly with the gasket during transport of the gasket, before it is installed.

SUMMARY OF THE INVENTION

Gaskets or connectors made of rubber, or similar resilient material, are typically utilized in sewage systems for providing a liquid tight seal between a pipe and an opening in a side wall of a cast member, such as, for example, a manhole assembly.

There are two standard techniques for mounting a gasket within an opening in a cast member. First, one can embed an end of the gasket into a cast member during the casting operation. In this manner, the gasket is integrally joined to the cast member during the casting operation as the cast member is being formed, for example, at the factory.

The other technique is to mount the gasket into an opening in a side wall of a cast member. The opening may be either formed during a casting operation or may be formed by the step of coring an opening in a member previously cast prior to installation of the gasket. Gaskets mounted into a cast member after a casting operation are provided with a mounting portion which has a surface designed to make substantially intimate engagement with the surface of the opening. An expansion band is then placed against the interior surface of the gasket mounting portion and is expanded by an amount sufficient to expand the gasket mounting portion and compress it between the expansion band and the opening in the side wall of the cast member. This is sufficient to maintain a liquid tight seal, satisfactory to withstand a given level of pressure, which may be exerted by subsurface water upon the liquid tight seal between the gasket and the cast member.

After the gasket has been mounted, it is ready to receive a pipe, which is inserted into the opposite end of the gasket. The gasket opposite end serves as the pipe engaging portion, the pipe being inserted into the gasket so that the pipe engaging portion encircles the exterior surface of the pipe at that point. In order to assure a proper liquid tight seal, a clamp, sometimes known as a take-down clamp, is placed about the outer periphery of the gasket pipe engaging portion. The clamp is then tightened by an amount suitable to provide the desired liquid tight seal between the gasket and the pipe.

Historically, the gasket and the clamp were shipped to the customer loose, either in a shared packaging or separately. For gaskets which have an end embedded into a cast member, it is common practice in the industry to take the gasket and mount it on hole forming equipment that positions the end to be embedded in the desired location during the casting of precast components in steel shaping molds. After the precast component is adequately cured, the precast producer will demold the component from the steel mold, remove the hole forming equipment and store the precast component. When it comes time to ship the precast component to the job site for installation, the manufacturer must locate and match the correct clamp to the gasket or make provisions for the contractor to do the same so that all gasket components are available at the time of installation. Such installations could be a short distance from the producer of the precast component, or as far as several hundred miles away. It is apparent that there can be much aggravation and expense associated with lost or misplaced clamps, not to mention the liability risk when the contractor goes to the local hardware store to improvise with a clamp that may not be suitable for direct burial.

One known packaging design which reduces the possibility of misplaced or lost clamps is illustrated in U.S. Pat. No. 6,921,085. That patent discloses a package including gasket mounting clamps and instructions for mounting same. The mounting clamps include an expansion clamp and a take-down clamp. The expansion clamp engages an interior of the gasket. The take-down clamp is positioned in the gasket and is urged against a surface of either the expansion clamp or the gasket. A flexible fastener loops through the expansion clamp and around the take-down clamp, also passing through an opening in an instruction card, thereby retaining the card and the take-down clamp within the gasket.

However, in a design where there is no expansion clamp, the take-down clamp could not be easily held within the gasket with such a flexible fastener.

Accordingly, it is desirable to develop a new and improved packaging design for gaskets and clamps which would overcome the foregoing difficulties and others while providing better and more advantageous overall results.

BRIEF SUMMARY OF THE INVENTION

In one embodiment of the present invention, a gasket assembly is provided.

In this embodiment of the invention, the gasket assembly comprises a one-piece gasket including a mounting end for mounting to an opening of an associated enclosure body and a pipe engaging end for receiving an associated pipe. An intermediate section is located between the mounting end and the pipe engaging end. A mounting element, of one piece with one of the mounting end, the pipe engaging end and the intermediate section, is provided on the gasket. A clamping member is provided for use with the gasket. The clamping member is looped to assume an annular configuration. A retaining member is looped through an aperture in the mounting element and through the clamping member for retaining the clamping member to the gasket in a transport position.

According to another aspect of the present invention, a gasket assembly is provided. In this embodiment of the invention, a gasket is made of a resilient material and includes an annular mounting end for mounting to an opening of an associated cast member and a pipe engaging end for receiving an associated pipe. A tapered intermediate section is located between the mounting end and the pipe engaging end. A clamping member is used on the pipe engaging end of the gasket. The clamping member is looped to assume an annular configuration. The clamping member cooperates with the gasket pipe engaging end in a use position of the gasket. An elongated tie is looped through an aperture located in the mounting element and through the clamping member for retaining the clamping member to the gasket in a transport position of the gasket.

In accordance with another aspect of the present invention, a gasket assembly is provided for joining together a pipe and an enclosure body, having an opening formed therein. More particularly, in accordance with this aspect of the invention, the gasket assembly comprises a one-piece elastomeric gasket which assumes a first, transport orientation and a second, use orientation. The gasket comprises a larger end for mounting to an opening of an associated enclosure body and a smaller end for receiving an associated pipe. A tapered intermediate section is located between the two ends. A mounting element is of one piece with one of the larger end, the smaller end and the intermediate section. A clamp assembly is looped to assume an annular configuration. In the use orientation of the gasket, the clamp assembly extends around the smaller end of the gasket for clamping around the associated pipe. A close looped fastener, looped through an aperture located in the mounting element and through the clamp assembly, retains the clamp assembly to the gasket in the transport orientation of the gasket.

Other benefits and advantages of the present invention will become apparent to those skilled in the art upon a reading and understanding of the following detailed specification.

BRIEF DESCRIPTION OF THE DRAWINGS

The invention may take form in certain components and structures, preferred embodiments of which will be described in detail in this specification and illustrated in the accompanying drawings, wherein:

FIG. 3A is a side elevational view in cross section of another gasket assembly, together with a mounting mandrel used in a placement of the gasket in an associated cast member;

FIG. 6 is a perspective view of a portion of a gasket assembly according to a second embodiment of the present invention;

FIG. 7 is a perspective view of a gasket assembly according to a third embodiment of the present invention;

FIG. 8 is a perspective, broken away, view of a gasket assembly according to a fourth embodiment of the present invention;

FIG. 9 is an enlarged perspective view of a portion of the gasket assembly of FIG. 8;

DETAILED DESCRIPTION

Figure 1:
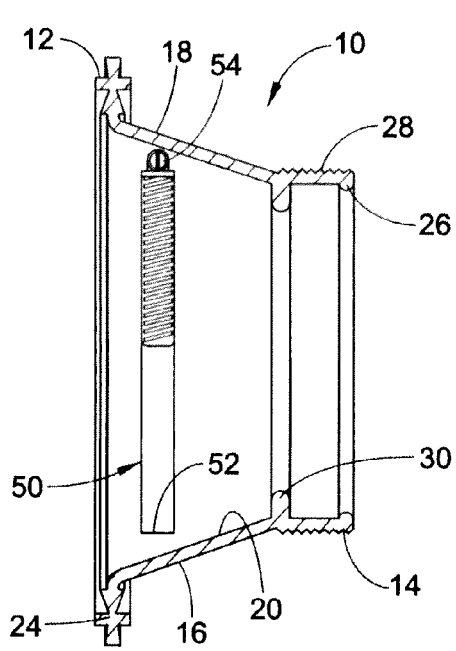
FIG. 1 is a schematic cross sectional view of a first embodiment of a gasket assembly according to the present invention, in a first orientation.

Referring now to the drawings, wherein the showings are for purposes of illustrating preferred embodiments of the invention only and not for purposes of limiting same, FIG. 1 illustrated a gasket assembly according to a first embodiment of the present invention. In FIG. 1, a gasket body 10 is provided. The gasket body includes a first or mounting end 12 and a second or pipe engaging end 14. An intermediate portion 16 connects the two ends. As is evident from FIG. 1, the gasket body can have a somewhat tapered configuration. The gasket body also includes a first wall 18 and a second wall 20. The first and second walls 18 and 20 of the gasket can be either the inner wall or the outer wall of the gasket, depending on its orientation. An anchoring projection 24 can be located at the first end 12. The anchoring projection is also sometimes known as the embedment end of the gasket. Located adjacent the second end 14 is a bead 26. While the anchoring projections 24 are located on the first wall 18, it is evident that the bead 26 is located on the second wall 20. Located on the first wall adjacent the second end are a plurality of spaced ribs or serrations 28, which can extend circumferentially around the gasket. The gasket 10 is of conventional design and can be formed from a resilient material, such as rubber or a rubber-like material, which is compressible and it can be partially expandable as well.

Spaced from the bead 26 and located on the second wall 20 are tabs 30. As is evident from FIG. 2, in this embodiment, there are two tabs which are spaced from each other by approximately 180° so that the two tabs face each other. Also, an installation tag 34 can be provided for the gasket assembly. After the gasket has been formed, it can be turned inside out. In other words, the gasket is pulled so that the second wall 20 now becomes the outer wall, as the gasket is pulled via arrows 44 in FIG. 3. Now, the bead 26 is located on the outer wall of the gasket and the ribs or serrations 28 are located on the inner wall thereof.

Figure 2:
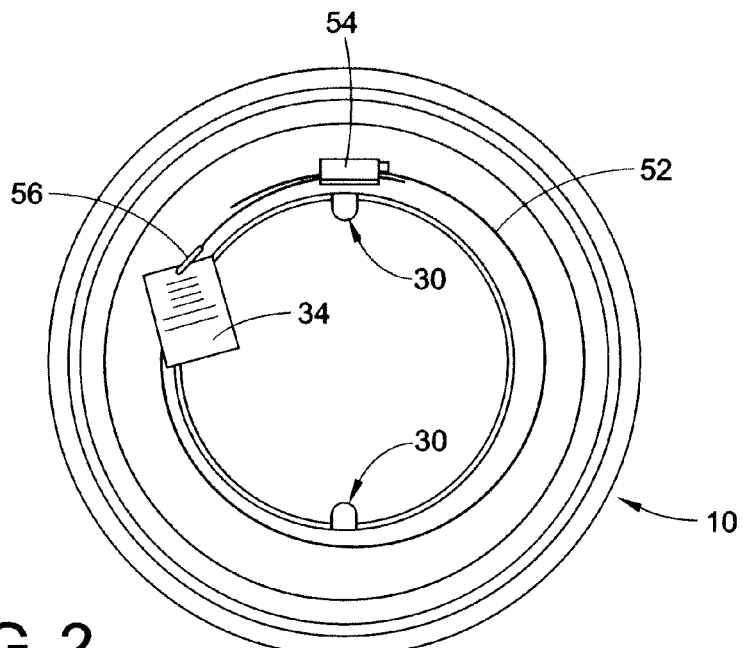
FIG. 2 is a front elevational view thereof.

Positioned in the gasket, is a take-down clamp assembly 50. The take-down clamp can be a conventional clamp, which finds widespread use through a variety of different industries. It is similar to a tightening clamp used, e.g., in the automotive industry for tightening hoses in vehicles such as cars, trucks or farm equipment. It includes a band 52 and a tightening screw 54 (FIG. 2). This is tightened conventionally via a torque wrench, or similar tool. The take-down clamp may be formed of plastic, metal or a combination of suitable known non-corrosive materials. The installation tag can be secured to the band 52 via a loop 56 of material that is either part of the tag or is a separate loop fastener of the type illustrated in U.S. Pat. No. 6,921,085. That patent is incorporated hereinto, in its entirety.

Figure 3:
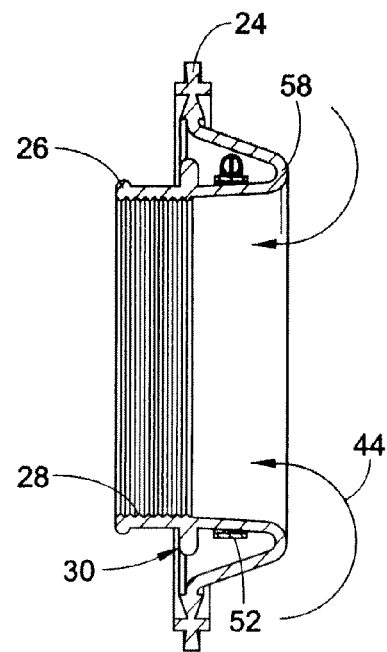
FIG. 3 is a side elevational view, in cross section, of the gasket assembly of FIG. 1 in a second orientation
Figure 4:
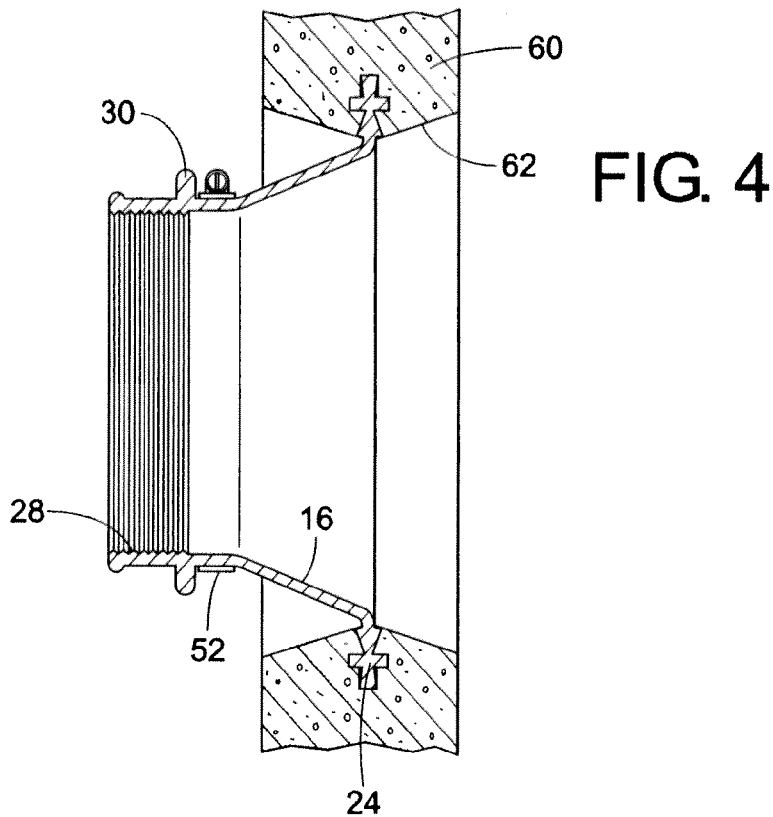
FIG. 4 is a cross sectional view of the gasket assembly of FIG. 1 in a third orientation, as installed in an associated cast member.

As is evident from FIG. 3, when the gasket body 10 is partially pulled through itself, so as to assume a transport position, the clamp assembly 50 is trapped between the tabs 30 and a curved portion 58 of the gasket material. In this orientation, the gasket assembly can then be shipped from the gasket manufacturing site to the concrete casting assembly site, where it will be installed in the cast member. With reference now to FIG. 4, it can be seen that when the gasket body 10 is installed in a cast member 60, the anchoring projections 24 are embedded in the material of the cast member. Now, the gasket body can be pulled all the way through, as is illustrated in FIG. 4.

Figure 5:
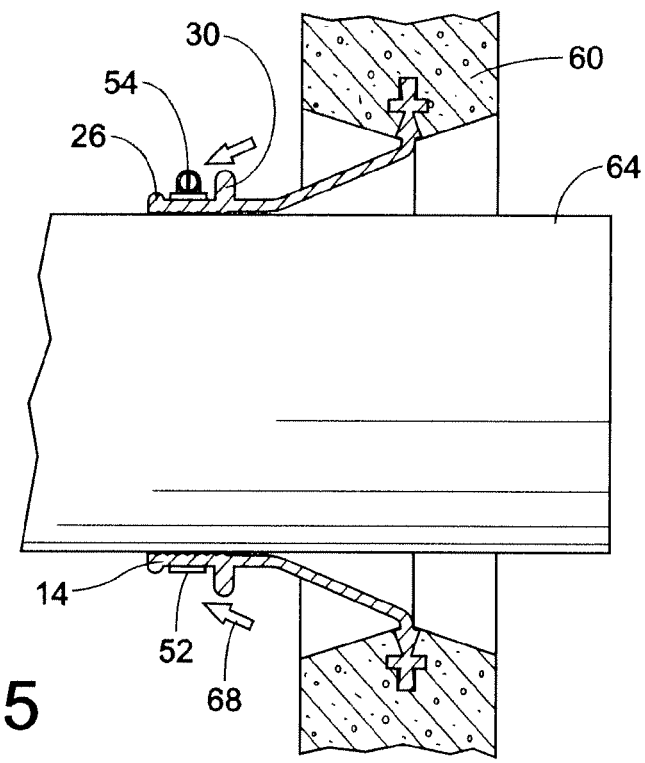
FIG. 5 is a side elevational view in cross section of the gasket assembly of FIG. 4 in a fourth orientation, with a pipe extending through the gasket.

However, in this orientation, the clamp assembly 50 is still not located in its final position. With reference now to FIG. 5, a pipe 64 can be inserted through the opening 62 in the cast member 60 and the gasket pipe engaging end 14. Then, the clamp assembly 50 can be pulled over the tabs 30 and into its final position, adjacent bead 26, as shown by arrows 68. There, it is tightened around the gasket pipe engaging end so that the gasket body 10 seals against the pipe 64 in a liquid-tight manner.

Shown in FIG. 3A is an alternate embodiment in which like components are identified by like numerals with a primed suffix (') and a new components are identified by new numerals. FIG. 3A illustrates a gasket body 10' in which a pipe engaging end 14' has been partially pulled through the gasket so as to assume a transport position, as in FIG. 3 discussed hereinbefore. A clamp assembly 50' is located adjacent one of a plurality of tabs 30' such that the clamp assembly 50' is spaced from a bead 26'. Also illustrated in FIG. 3A is a mounting mandrel having two sections 65 and 67. The mandrel is used in the mounting of the gasket assembly 10' in the correct location during the casting of the associated cast member, such as the cast member 60 illustrated in FIG. 4.

While it has been noted that the gasket 14 comprises a resilient material, that material does not have to be of a single durometer. In other words, one could utilize a dual durometer gasket material, in order to enhance the characteristics of the retaining member, for retaining the take down clamp assembly to the gasket in the transport position. For example, the tabs 30 could be made of a harder durometer compound than the remainder of the gasket or connector body 10. This would enhance the ability of the tabs 30 to secure the clamp assembly 50 in position, until the time of installation. Also, a dual durometer material could be employed such that the first and second walls 18 and 20 (FIG. 1) of the gasket are made of a higher durometer material, to strengthen the wall in order to better resist hydrostatic pressure. At the same time, a lower durometer material can be employed for the spaced ribs 28 (FIG. 1) of the gasket, to allow a better liquid tight seal to form between the pipe 64, illustrated in FIG. 5, and the gasket 10.

With reference now to FIG. 6, a further embodiment of the present invention includes a gasket body 190 having a first tab 192, a second tab 194 and a third tab 196. In this embodiment, the three tabs are aligned with each other, as is evident. The gasket body 190 accommodates a first band 198 and a second band 200. In this embodiment, a suitable conventional tie 202 can extend through the set of aligned tabs. The tabs 192-196 could be made of a higher durometer material than the remainder of the gasket, in order to enhance the characteristics of the retaining member to secure the take down clamp during shipment. It should be appreciated that such a dual durometer design could be employed on any of the embodiments discussed herein.

The tie includes a first protrusion 204 on a first end thereof, an elongated central section 206 and a second protrusion 208 at its opposite end. Suitable apertures 210 in the aligned tabs allow for the elongated section of the tie to extend through the tabs, thereby holding the first and second bands 198 and 200 in position on the gasket body for transport purposes. In this embodiment, the bands are shipped in their use position. But, if the bands would need to be moved to their use position, the tie 202 can simply be cut. Then, the bands can be moved from their transport position to their use position.

While FIG. 6 illustrates an embodiment in which three tabs are aligned with each other, it should be appreciated that a further embodiment could only have two tabs aligned with each other. Such an embodiment would accommodate a single band, when only a single band is called for in connection with securing the gasket body and around a pipe.

With reference now to FIG. 7, a still further embodiment of the present invention comprises a gasket 350 which includes a pair of spaced and aligned tabs 352 and 354. In this embodiment, each tab is manufactured with a through hole or aperture 356 and 358, respectively. A suitable conventional push pin 360 can be employed in this embodiment. More particularly, the push pin can include a tapered tip 362 which can protrude through the aligned apertures 356 and 358, a stem portion 364 and a bulbous head portion 366. When the push pin extends through the tabs, a clamping band (not illustrated in this embodiment) extending between the tabs, is held in place on the gasket body 350. The push pin is prevented from being pulled out of the tabs due to the presence of an enlarged proximal end or shoulder 368 of the tip 362. It resists being pulled back through the tabs. To remove the push pin, it can be simply cut away or removed. In one embodiment, the push pin can be formed from a suitable conventional plastic or metal material.

The prior embodiments pertain to molded gaskets. Molded gaskets or rubber connectors are generally supplied in diameters ranging from 1" to 18". Gaskets having diameters greater than 18" are generally extruded. In this way, one shape can be used for various diameters in a range by varying the cut length of the profile, in order to accommodate the necessary sealing requirement. However, with extruded gaskets, the extrusion profile must be constant. Therefore, tabs cannot be extruded, only molded. Accordingly, a flange must be extruded on the gasket in order to accomplish the holding function of securing a clamping band or a clamping member to the gasket.

With reference now to FIG. 8, a fourth embodiment of a gasket assembly according to the present disclosure is there illustrated. In this embodiment, an extruded gasket is disclosed. Since it is extruded, the gasket can be of any suitable desired diameter. The ends of the extruded gasket are secured to each other in a conventional manner so that the gasket forms a toroidal configuration. In this embodiment, a gasket body 410 includes a first, mounting end 412 and a second, pipe engaging end 414. An intermediate portion 416 connects the two ends. Located on the second end 414 are a set of aligned ribs 428 which can be best seen in FIG. 9. Extending away from the pipe engaging end 414 is a flange 430. With continued reference to FIG. 9, it can be seen that the flange extends in a direction that can be oriented approximately normal to a sealing plane formed by the ribs 428. Of course, other angular relationships are also contemplated. Extending through the flange 430 is an aperture 432. FIG. 9 illustrates that the aperture is spaced away from the ribs 428 in order not to interfere with the sealing function performed by the gasket second end 414. Also, if desired, the flange can include a beaded end portion 434 as illustrated in FIG. 8.

Extending through the aperture 432 is a retaining member. In this embodiment, the retaining member can be an elongated tie, in the form of a close looped fastener. Such fasteners are conventional and, as best shown in FIG. 9, generally include a proximal end 442 and a distal end 444 and a central portion 445. Positioned on the proximal end is a retaining element 446. In this embodiment, also positioned on the proximal end is a component identification plate or tag 448. As is well known, the retaining member can be a continuous plastic member with the central portion 445 being provided with enlargements or indentations (not visible) at spaced intervals along the length of the elongated member. The distal end and the central portion, having the spaced enlargements or indentations, is urged into the locking member. So long as one of the enlargements or indentations passes a given point within the locking member, the retaining member, which can also be termed a tie wrap, may not be pulled apart. Metallic or combination metal/plastic tie wraps may be employed, as can completely plastic tie wraps or close looped fasteners. Many types of fasteners of this nature are known to the art.

Such a retaining member or tie wrap can hold one or more compression bands or clamping members 450 to the gasket 410 in order to form the gasket assembly. In the embodiment illustrated in FIG. 8, two such compression bands are attached to the gasket body 410. More particularly, each compression band or clamp assembly 450 includes a band 452 and a tightening screw or other tightening element 454. One reason why two or more compression bands or clamp assemblies would be secured to the gasket is to fit around larger diameter gaskets. For example, the two clamp assemblies may be secured or "fished" together to accommodate the larger diameter of the gasket. In the embodiment illustrated in FIGS. 8 and 9, an extruded gasket, of any desired diameter, can have mounted thereto one or more compression bands, clamp assemblies or take down clamps so that these elements are readily available at the job site.

Figure 11:
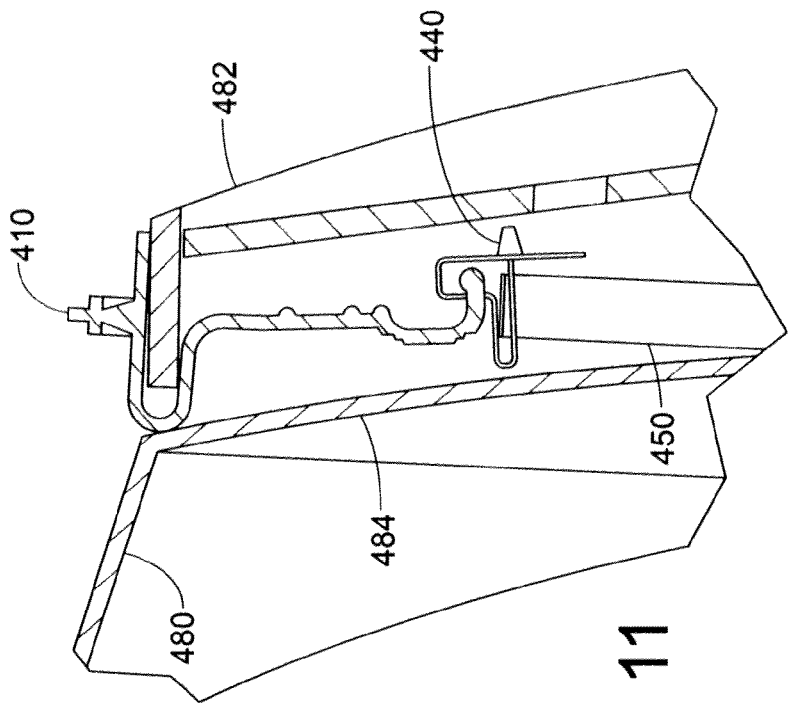
FIG. 11 is a perspective view of the gasket assembly of FIG. 8 as mounted on a radius wall mandrel.
Figure 10:
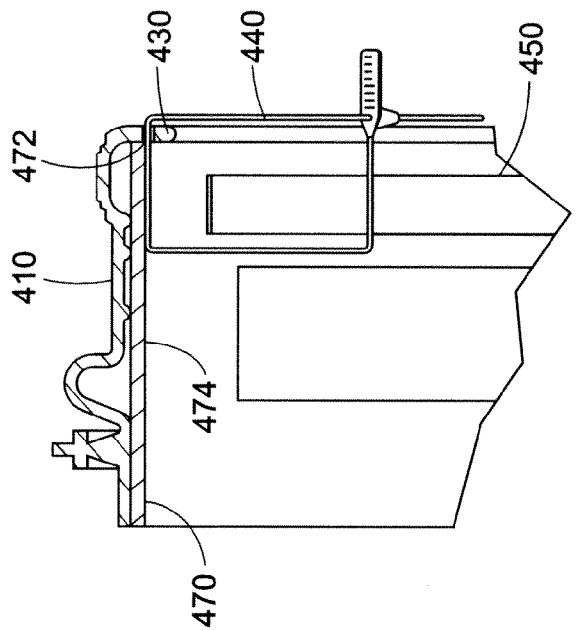
FIG. 10 is a perspective view of a gasket assembly of FIG. 8, as mounted on a flat wall mandrel.

The gaskets shown in FIGS. 8 and 9 can be mounted on mandrels or hole formers, if so desired. With reference now to FIG. 10, one type of mandrel, namely, a flat wall mandrel 470, is there illustrated. The gasket 410 is shown as being mounted over the mandrel 470 such that the lip 430 extends over an end wall 472 of the mandrel. As can be seen, the fastener 440 and the compression band 450 depend from the lip 430 and are encircled by an inner periphery 474 of the mandrel. In another embodiment, as illustrated in FIG. 11, a round wall mandrel is shown. This mandrel comprises a first piece 480 and a second piece 482. In this embodiment, the gasket 410 is trapped between an end wall 484 of the first mandrel piece 480 and the second mandrel piece 482. The fastener 440 and the band 450 are thus located between the first and second mandrel pieces 480 and 482.

Figure 12:
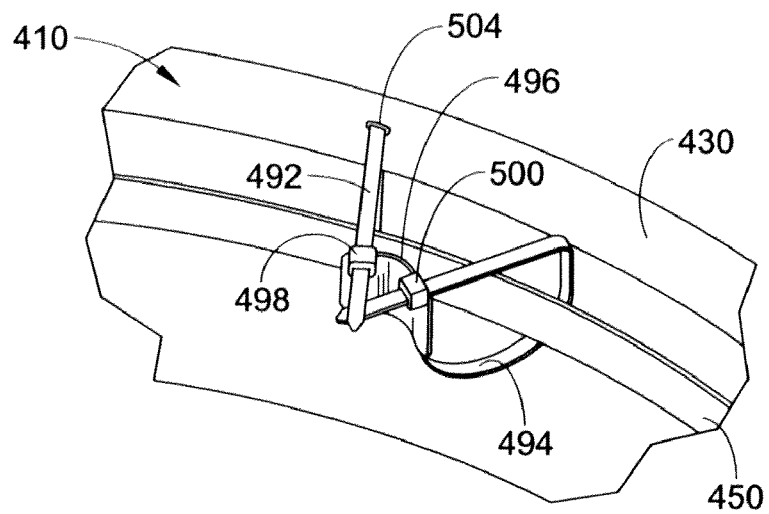
FIG. 12 is a perspective view of a gasket assembly according to a fifth embodiment of the present invention.
Figure 13:
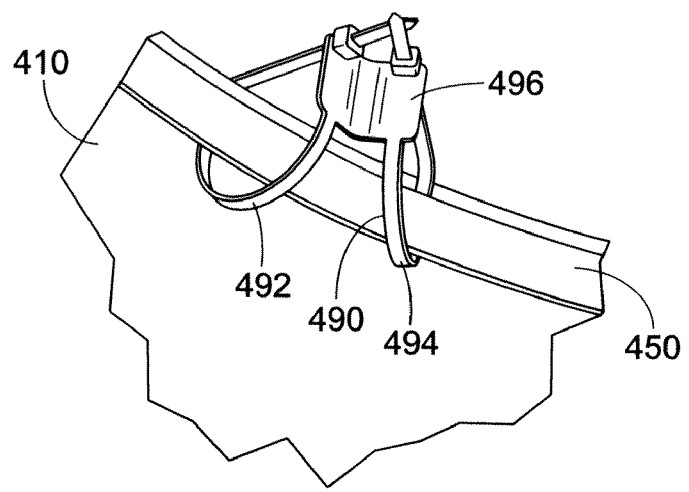
FIG. 13 is a perspective view of the gasket assembly of FIG. 12 from another direction.

With reference now to FIG. 12, a different type of fastener 490 can also be employed. This fastener comprises a first strap 492 and a second strap 494. The straps extend from a fastener end portion 496, which is enlarged so that it can also function as the component identification tag. First and second securing portions 498 and 500 are provided on the fastener end portion so that the first and second straps can be looped through, respectively, a compression band 450 and the gasket body 410 and secured in place, as can be best seen in FIG. 13. With reference again to FIG. 12, the first strap 492 is looped through the flange 430 of the gasket 410. In this embodiment, the straps are wide, and they could be termed bands. As a result, a slit 504 is provided in the gasket flange 430, to accommodate the strap 492.

Figure 14:
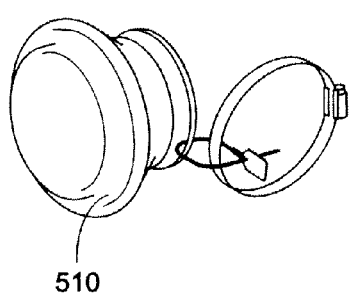
FIG. 14 is a perspective view of a gasket assembly according to a sixth embodiment of the present invention.
Figure 15:
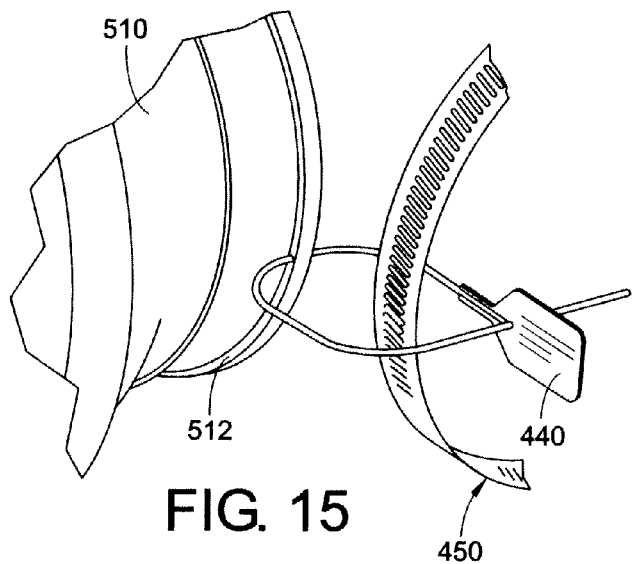
FIG. 15 is an enlarged view of a portion of the gasket assembly of FIG. 14.

With reference now to FIG. 14, the connector can be employed on a different type of gasket 510. With reference also to FIG. 15, the gasket includes a lip 512 through which the fastener 440 is looped so as to hold a compression band 450 to the gasket.

Figure 16:
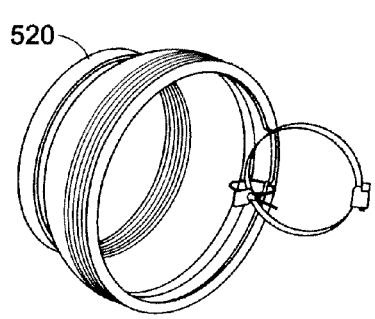
FIG. 16 is a perspective view of a gasket assembly according to a seventh embodiment of the present invention.
Figure 17:
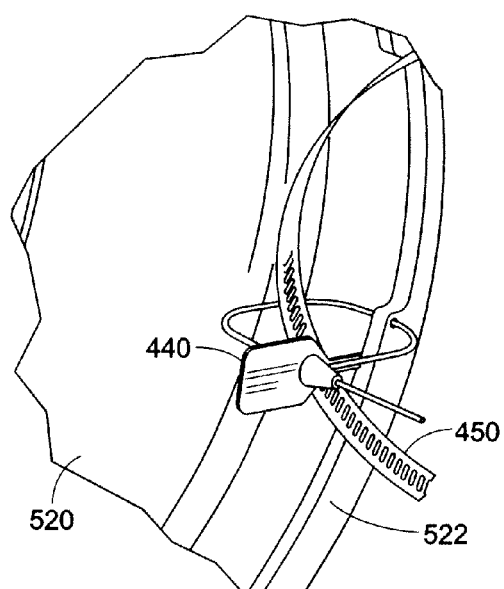
FIG. 17 is an enlarged view of a portion of FIG. 16.

With reference now to FIG. 16, yet another type of gasket 520 is there illustrated. As best shown in FIG. 17, the gasket includes a lip 522 through which the fastener 440 is looped. The compression band 450 is thus held to the gasket.

Figure 19:
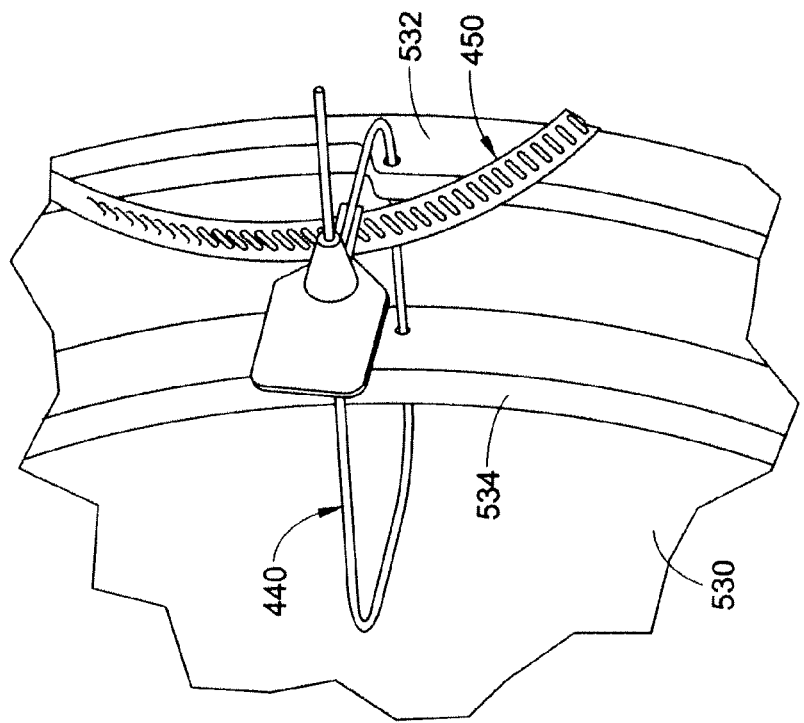
FIG. 19 is a perspective view of a further alternative fastening arrangement for the embodiment of FIG. 16.
Figure 18:
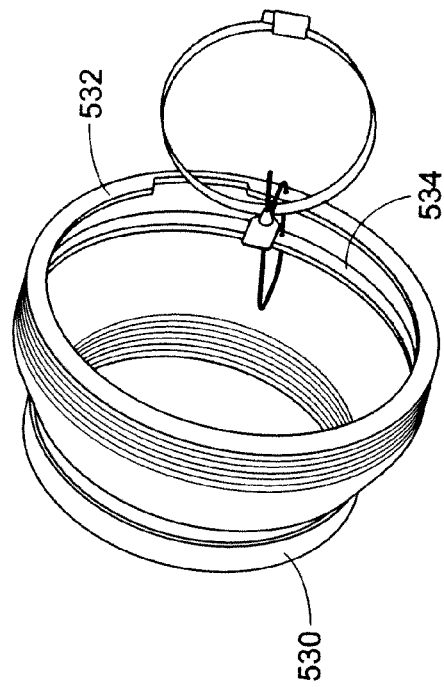
FIG. 18 is a perspective view of an alternative fastening arrangement for the embodiment of FIG. 16.

FIGS. 18 and 19 illustrate yet another embodiment. In this embodiment, a gasket 530 has first and second lips 532 and 534 and the fastener 440 is looped through aligned apertures in both lips so as to hold the compression band 450 to the gasket.

Figure 22:
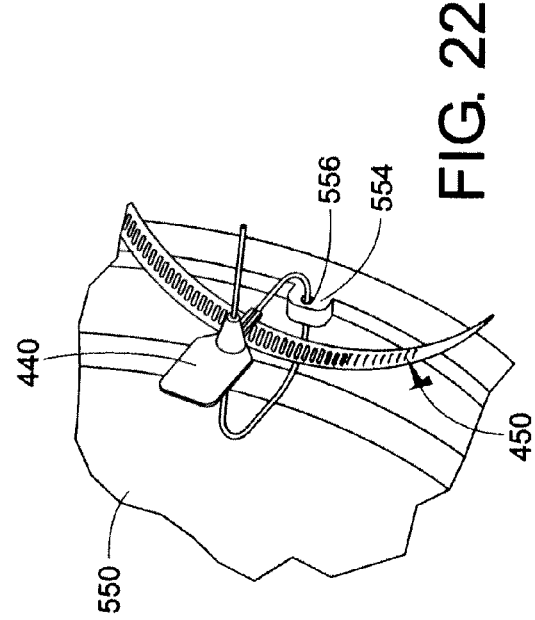
FIG. 22 is a perspective view of an alternative embodiment of the gasket assembly of FIG. 20.
Figure 20:
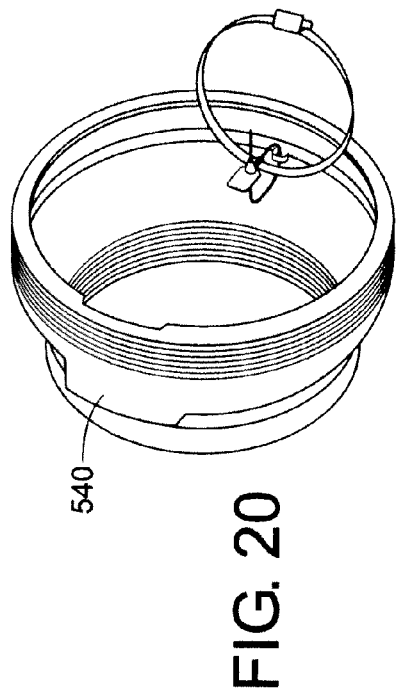
FIG. 20 is a perspective view of a gasket assembly according to an eighth embodiment of the present invention.
Figure 21:
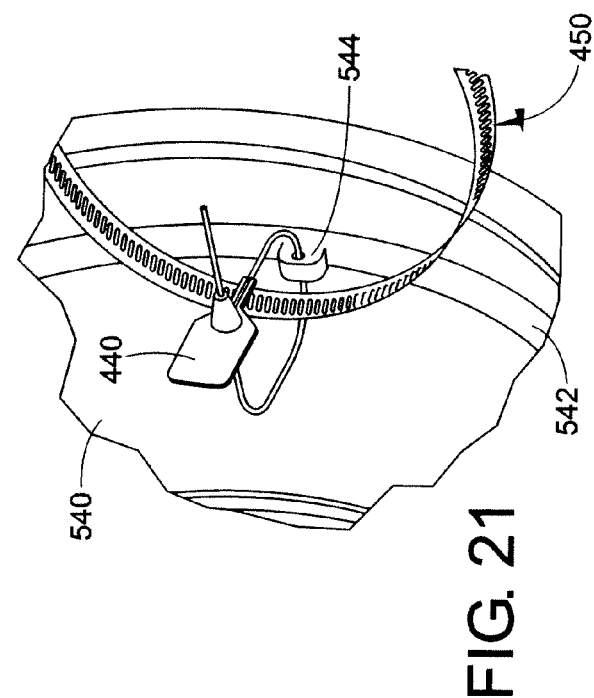
FIG. 21 is an enlarged view of a portion of the gasket assembly of FIG. 20.

Another embodiment is illustrated in FIGS. 20 and 21. A gasket 540 includes a lip 542 on which is disposed a tab 544. The fastener 440 is looped through an aperture 556 in the tab 544 so as to hold the compression band 450 to the gasket 540. FIG. 22 illustrates a gasket 550 which is provided with a lip 552 on which there is disposed a tab 554. The fastener 440 is looped through the tab and holds a compression band 450 to the gasket 550. Since tabs 544 and 554 are illustrated in FIGS. 21 and 22, it is apparent that the gaskets 540 and 550 illustrated therein are molded gaskets, not extruded gaskets.

Figure 23:
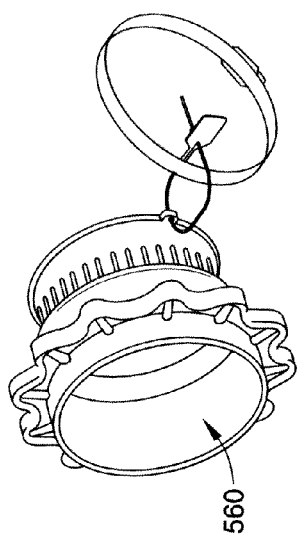
FIG. 23 is a perspective view of a ninth embodiment of the present invention.
Figure 24:
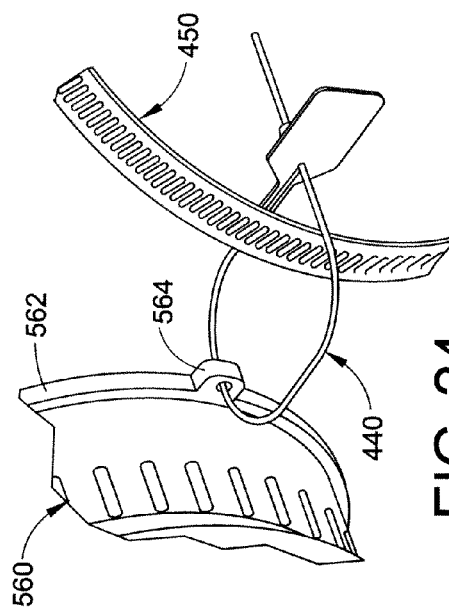
FIG. 24 is an enlarged view of a portion of the gasket assembly of FIG. 23.

FIGS. 23 and 24 illustrate yet another embodiment. In this embodiment, a gasket 560 is provided with a lip 562 on which there is disposed a tab 564. The fastener 440 is looped through the tab and holds the compression band 450 to the gasket. As with the previous embodiment, the presence of the tab 564 indicates that the gasket 560 illustrated herein is a molded gasket.

Figure 25:
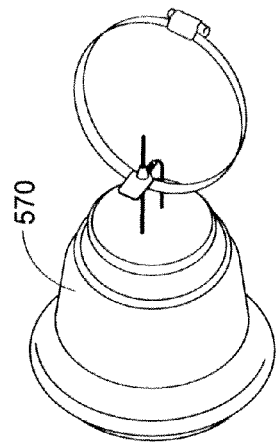
FIG. 25 is a perspective view of a tenth embodiment of the present invention; and, FIG. 26 is an enlarged view of a portion of the gasket assembly of FIG. 25.
Figure 26:
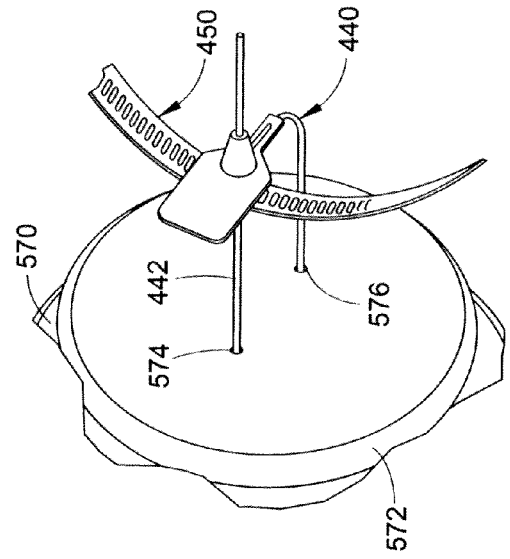

Finally, another embodiment is illustrated in FIGS. 25 and 26. In this embodiment, a gasket 570 includes an end wall 572. Extending through a pair of spaced apertures 574 and 576 in the end wall is the fastener body 442. The compression band 450 is thereby held to the gasket 570 by the fastener 440. As with the previous two embodiments, the gasket 570 illustrated herein is a molded gasket.

Disclosed herein have been several embodiments of a gasket assembly including a gasket and a clamp assembly for use on a pipe engaging end of the gasket. The gasket includes a retaining means, of one piece with a gasket, and extending from a wall of a gasket for retaining the clamp assembly to the gasket in a transport position. A variety of retaining means has been disclosed. These include tabs spaced circumferentially around the gasket body, aligned tabs, through which a tie selectively extends, as well as a variety of flanges. Also presented have been fasteners which cooperate with the retaining means to retain the clamp assembly in a transport position on the gasket. Such fasteners would be removed in order to allow the clamp to assume a use position or orientation. In all of these designs, the retaining means is of one piece with the gasket so that it can be molded or extruded as the gasket is molded or extruded. Thus, the disclosed embodiments eliminate the need for using a separate expansion band, such as is disclosed in the U.S. Pat. No. 6,921,085 for holding a takedown clamp to the gasket before the clamp is mounted to the gasket in the use position.

The invention has been described with reference to several preferred embodiments. Obviously, modifications and alterations will occur to others upon a reading and understanding of this specification. It is intended to include all such modifications and alterations insofar as they come within the scope of the appended claims or the equivalents thereof.

The invention claimed is:

1. A gasket assembly comprising:
   a gasket made of a resilient material and including:
      an annular mounting end for mounting to an opening of an associated cast member,
      a pipe engaging end for receiving an associated pipe,
      a tapered intermediate section located between said pipe engaging end and said mounting end, and a mounting element of one piece with one of said mounting end,
said pipe engaging end and said intermediate section;
a clamping member for use with said gasket pipe engaging end, said clamping member being looped to assume an annular configuration, said clamping member cooperating with said gasket pipe engaging end in a use position of said gasket; and,
an elongated tie looped through an aperture located in said mounting element and through said clamping member for retaining said clamping member to said gasket in a transport position of said gasket.

2. The gasket assembly of claim 1 wherein said pipe engaging end comprises a sealing surface and wherein said mounting element is oriented at approximately a right angle in relation to said sealing surface.

3. The gasket assembly of claim 1 further comprising a card having instructions for mounting said gasket to the associated pipe.

4. The gasket assembly of claim 3 wherein said card is mounted on said elongated tie.

5. The gasket assembly of claim 4 wherein said card is of one piece with said elongated tie.

6. The gasket assembly of claim 1 further comprising a second clamping member, said elongated tie extending through said second clamping member.

7. The gasket assembly of claim 1 wherein said mounting element comprises a lip.

8. The gasket assembly of claim 7 wherein said lip is located on said gasket pipe engaging end.

9. The gasket assembly of claim 8 wherein said lip is spaced from said sealing surface defined on said gasket pipe engaging end so as to not interfere with a sealing function of said gasket.

10. A gasket assembly for joining together an associated pipe and an associated enclosure body having an opening formed therein, the gasket assembly comprising:

a one piece elastomeric gasket which assumes a first, transport orientation and a second, use orientation including:
a larger end for mounting to an opening of an associated enclosure body,
a smaller end for receiving an associated pipe,
a tapered intermediate section located between said pipe engaging end and said mounting end, and
a mounting element of one piece with one of said larger end, said smaller end and said intermediate section,
a clamp assembly, said clamp assembly being looped to assume an annular configuration, said clamp assembly extending around said smaller end of said gasket in a use position of said gasket; and,
a close looped fastener looped through an aperture located in said mounting element and through said clamp assembly for retaining said clamp assembly to said gasket in the transport orientation of said gasket.

11. The gasket assembly of claim 10 wherein said mounting element includes one of a lip and a tab.

12. The gasket assembly of claim 11 wherein said mounting element extends away from said one of said mounting end, said pipe engaging end and said intermediate section.

13. The gasket assembly of claim 10 further comprising a card having instructions for mounting said gasket to the associate pipe.

14. The gasket assembly of claim 13 wherein said card is of one piece with said close looped fastener.

15. The gasket assembly of claim 13 wherein said card is mounted on said close looped fastener.

16. The gasket assembly of claim 10 wherein said mounting element is located on said gasket smaller end.

17. The gasket assembly of claim 16 wherein said mounting element is spaced from a sealing surface defined on said gasket smaller end so as to not interfere with a sealing function of said gasket.

* * * * *